(12) United States Patent
Yoshioka et al.

(10) Patent No.: US 9,396,654 B2
(45) Date of Patent: Jul. 19, 2016

(54) IN-VEHICLE TRAFFIC INFORMATION NOTIFICATION DEVICE

(75) Inventors: Shotaro Yoshioka, Tokyo (JP); Makoto Oi, Kobe (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/410,534

(22) PCT Filed: Jul. 17, 2012

(86) PCT No.: PCT/JP2012/068096
§ 371 (c)(1),
(2), (4) Date: Dec. 22, 2014

(87) PCT Pub. No.: WO2014/013542
PCT Pub. Date: Jan. 23, 2014

(65) Prior Publication Data
US 2015/0243166 A1    Aug. 27, 2015

(51) Int. Cl.
| | |
|---|---|
| *G08G 1/133* | (2006.01) |
| *G08G 1/09* | (2006.01) |
| *G01C 21/36* | (2006.01) |
| *G01C 21/34* | (2006.01) |

(Continued)

(52) U.S. Cl.
CPC ............ *G08G 1/091* (2013.01); *G01C 21/3484* (2013.01); *G01C 21/367* (2013.01); *G01C 21/3691* (2013.01); *G08G 1/0112* (2013.01); *G08G 1/0129* (2013.01); *G08G 1/0962* (2013.01); *G08G 1/09626* (2013.01); *G08G 1/09675* (2013.01); *G08G 1/096716* (2013.01); *G08G 1/096775* (2013.01)

(58) Field of Classification Search
CPC ....... G08G 1/091; G08G 1/0969; G08G 1/20; G08G 1/0104; G08G 1/0129; G01C 21/367; G01C 21/3691; G01C 21/3617
USPC .......... 701/117, 423, 424, 414; 340/905, 988, 340/907, 995.13
See application file for complete search history.

(56) References Cited

U.S. PATENT DOCUMENTS

| | | | |
|---|---|---|---|
| 7,630,828 B2 | 12/2009 | Tajima et al. | |
| 8,301,323 B2 | 10/2012 | Niwa | |

(Continued)

FOREIGN PATENT DOCUMENTS

| | | |
|---|---|---|
| CN | 1539075 A | 10/2004 |
| CN | 101297337 A | 10/2008 |

(Continued)

*Primary Examiner* — Dalena Tran
(74) *Attorney, Agent, or Firm* — Birch, Stewart, Kolasch & Birch, LLP

(57) ABSTRACT

An object of the present invention is to provide an in-vehicle traffic information notification device which, even when it is difficult to specify a traveling route of an own car, can notify adequate traffic information to users. A passage probability calculator of the traffic information notification device calculates a passage probability which is a probability that the own car passes an occurrence position of each traffic hazard obtained by a traffic information receiver, based on a current position of the own car detected by a current position detector and traveling history data stored in a traveling history data storage. A display unit and a sound output unit notify occurrence information of the traffic hazard to the user by a mode corresponding to the passage probability of the traffic hazard.

14 Claims, 9 Drawing Sheets

(51) Int. Cl.
*G08G 1/01* (2006.01)
*G08G 1/0962* (2006.01)
*G08G 1/0967* (2006.01)

(56) References Cited

U.S. PATENT DOCUMENTS

| | | |
|---|---|---|
| 2001/0001848 A1 | 5/2001 | Oshizawa et al. |
| 2002/0121989 A1 | 9/2002 | Burns |
| 2004/0128066 A1 | 7/2004 | Kudo et al. |
| 2005/0251325 A1 | 11/2005 | Kudo et al. |
| 2007/0038372 A1 | 2/2007 | Kudo et al. |
| 2007/0073477 A1 | 3/2007 | Krumm et al. |
| 2007/0150174 A1 | 6/2007 | Seymour et al. |
| 2007/0208492 A1 | 9/2007 | Downs et al. |
| 2007/0229309 A1* | 10/2007 | Tomita ............... G01C 21/3691 340/992 |
| 2009/0248286 A1* | 10/2009 | Nagase ........... G08G 1/096844 701/118 |
| 2010/0010733 A1* | 1/2010 | Krumm ............. G01C 21/3484 701/533 |
| 2011/0082636 A1 | 4/2011 | Barker et al. |
| 2011/0106416 A1 | 5/2011 | Scofield et al. |
| 2011/0210867 A1* | 9/2011 | Benedikt ................ G08G 1/01 340/905 |
| 2011/0224893 A1 | 9/2011 | Scofield et al. |
| 2011/0224898 A1 | 9/2011 | Scofield et al. |
| 2011/0282571 A1 | 11/2011 | Krumm et al. |
| 2012/0136561 A1 | 5/2012 | Barker et al. |
| 2014/0309914 A1 | 10/2014 | Scofield et al. |

FOREIGN PATENT DOCUMENTS

| | | |
|---|---|---|
| CN | 101438334 A | 5/2009 |
| CN | 101482419 A | 7/2009 |
| CN | 101620781 A | 1/2010 |
| CN | 101964148 A | 1/2010 |
| CN | 102460534 A | 5/2012 |
| DE | 102 33 376 A1 | 2/2004 |
| DE | 10 2006 001 819 A1 | 7/2007 |
| DE | 10 2007 043 533 A1 | 3/2009 |
| DE | 10 2008 005 796 A1 | 7/2009 |
| DE | 10 2009 031 480 A1 | 1/2010 |
| EP | 1 551 195 A1 | 7/2005 |
| JP | 2000-28376 A | 1/2000 |
| JP | 2000-266562 A | 9/2000 |
| JP | 2003-57049 A | 2/2003 |
| JP | 2006-284254 A | 10/2006 |
| JP | 2007-240271 A | 9/2007 |
| JP | 2009-244142 A | 10/2009 |
| JP | 2010-25691 A | 2/2010 |
| WO | WO 2011/133022 A1 | 9/2011 |

* cited by examiner

TRAVELING HISTORY DATA IN PAST THREE MONTHS

| ROUTE | THE NUMBER OF TIMES OF TRAVELING | ROUTE SYMBOL |
|---|---|---|
| L[1]→L[11]→L[13] | 63 TIMES | A |
| L[1]→L[11]→L[12] | 28 TIMES | B |
| L[1]→L[2]→L[3] | 15 TIMES | C |
| L[8] | 23 TIMES | D |
| L[5]→L[9] | 31 TIMES | E |
| L[1]→L[10] | 25 TIMES | F |
| L[1]→L[2]→L[15] | 13 TIMES | G |

F I G. 1 7
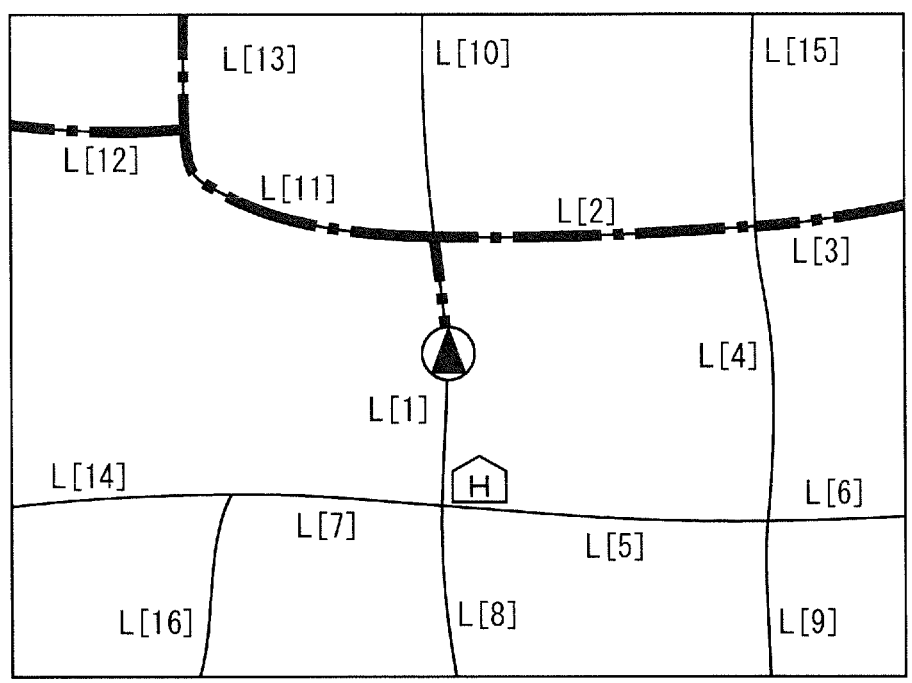

IN-VEHICLE TRAFFIC INFORMATION NOTIFICATION DEVICE

TECHNICAL FIELD

The present invention relates to an in-vehicle traffic information notification device.

BACKGROUND ART

One of functions of a car navigation device mounted on a vehicle is a traffic information notification function. When a traffic hazard such as traffic congestion occurs in a route to a destination, the car navigation device having the traffic information notification function notifies the traffic hazard to a user (driver) to guide the route to the destination. However, when a destination is not set, even if an occurrence of a traffic hazard is detected, whether or not an own car passes an occurrence position of this traffic hazard is typically unknown. Therefore, car navigation devices do not generally notify the traffic hazard.

Meanwhile, following Patent Documents 1 and 2 disclose car navigation devices which, when a destination is not set, estimate a traveling route of an own car and notifies information about a traffic hazard which the car is likely to encounter, to users.

PRIOR ART DOCUMENT

Patent Document

Patent Document 1: Japanese Patent Application Laid-Open No. 2000-28376
Patent Document 2: Japanese Patent Application Laid-Open No. 2000-266562

SUMMARY OF INVENTION

Problems to be Solved by the Invention

The car navigation devices of Patent Documents 1 and 2 have traffic information notification functions work by estimating a traveling route of an own car even when a destination is not set. However, there is a problem that, when the estimated route and a route in which a user actually travels do not match, adequate traffic information is not notified.

The present invention has been made in light of the above problem. An object of the present invention is to provide an in-vehicle traffic information notification device which, even when, for example, a destination is not set to a car navigation device, i.e., when it is difficult to specify a traveling route of an own car, can notify adequate traffic information to users.

Means for Solving the Problems

An in-vehicle traffic information notification device according to the present invention includes: a current position detector that detects a current position of an own car; a traveling history data storage that stores traveling history data of the car; a traffic information receiver that obtains traffic information including an occurrence position of a traffic hazard; a passage probability calculator that calculates a passage probability that is a probability that the own car passes an occurrence position of each traffic hazard, from the current position and the traveling history data of the own car; and a traffic hazard notifier that notifies occurrence information of the traffic hazard to a user by a mode corresponding to the passage probability of the traffic hazard.

Effects of the Invention

The present invention notifies occurrence information of traffic hazards to users by modes corresponding to passage probabilities and, consequently, can provide adequate information (the occurrence information of the traffic hazards of high passage probabilities) to the users. Further, a mode to notify each traffic hazard changes according to a passage probability of each traffic hazard.

Consequently, the users can intuitively recognize a value of the passage probability of each traffic hazard based on the mode to notify each traffic hazard.

An object, features, aspects and advantages of the present invention will be made more obvious by the following detailed description and the accompanying drawings.

BRIEF DESCRIPTION OF DRAWINGS

FIG. 17 shows a view showing an example of a mode to display a route in which a traffic hazard does not occur in the traffic information notification device according to a fifth embodiment.

DESCRIPTION OF EMBODIMENTS

First Embodiment

Figure 1:
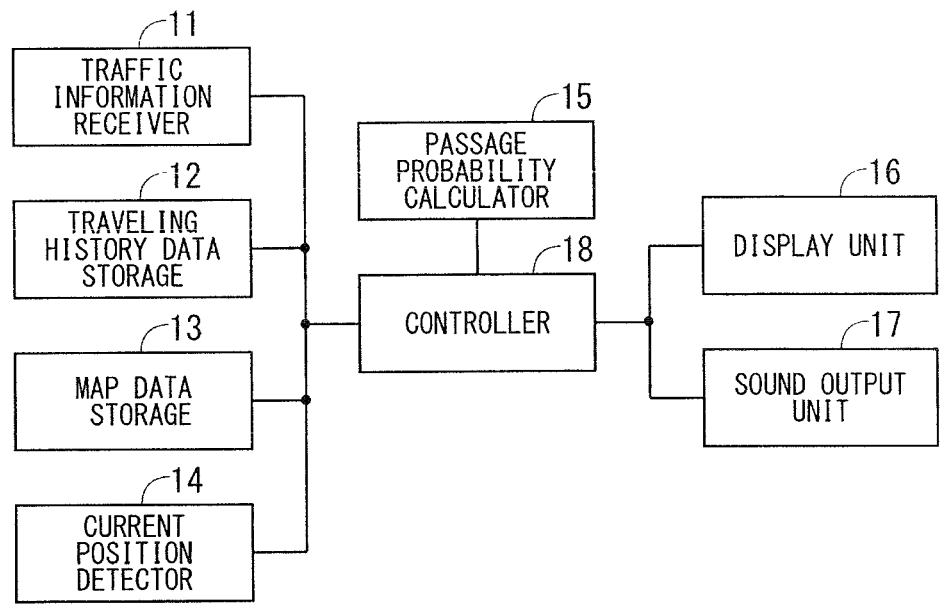
FIG. 1 shows a view showing a configuration of a traffic information notification device according to the present invention.

FIG. 1 shows a view showing a configuration of a traffic information notification device according to the present invention. This traffic information notification device is, for example, an in-vehicle traffic information notification device which is mounted on a car navigation device.

As shown in FIG. 1, the traffic information notification device has a traffic information receiver 11, a traveling history data storage 12, a map data storage 13, a current position detector 14, a passage probability calculator 15, a display unit 16, a sound output unit 17 and a controller 18.

The traffic information receiver 11 has a function of obtaining traffic information including occurrence positions of traffic hazards. The traffic information receiver 11 may be configured as a general-purpose communication device such as a mobile telephone or a smartphone or as a dedicated communication device such as a TMC (Traffic Message Channel) receiver or a VICS (Vehicle Information and Communications System) (registered trademark) receiver whose purpose is to obtain traffic information.

The traveling history data storage 12 has a function of storing traveling history data indicating a history of roads which an own car passed in the past.

The map data storage 13 stores digitized map data such as data of "nodes" representing spots on a map, and data of "links" representing roads which connect nodes.

The current position detector 14 has a function of detecting a current position of the own car based on information from a GPS receiver, a direction sensor and a distance sensor which are included in the own car and the map data stored in the map data storage 13. Consequently, the traffic information notification device can specify a road on which the car is traveling.

The passage probability calculator 15 has a function of finding one or more routes in which the own car is predicted to travel based on the current position detected by the current position detector 14 and the traveling history data of the own car stored in the traveling history data storage 12, and calculating a probability (referred to as a "passage probability" below) of each predicted route in which the own car travels.

The display unit 16 has a function of displaying map images represented by map data, symbols (icons) representing an own car position and occurrence positions of traffic hazards on the map, and characters (texts) representing the occurrence positions of the traffic hazards. The sound output unit 17 has a function of outputting a sound indicating an occurrence position of a traffic hazard. That is, the display unit 16 and the sound output unit 17 have traffic hazard notifier functions of notifying occurrence information of the traffic hazards to the user.

The controller 18 has a function of controlling the entire traffic information notification device by performing various computations required to operate the traffic information notification device, and controlling an operation of each of the above components.

Figure 2:
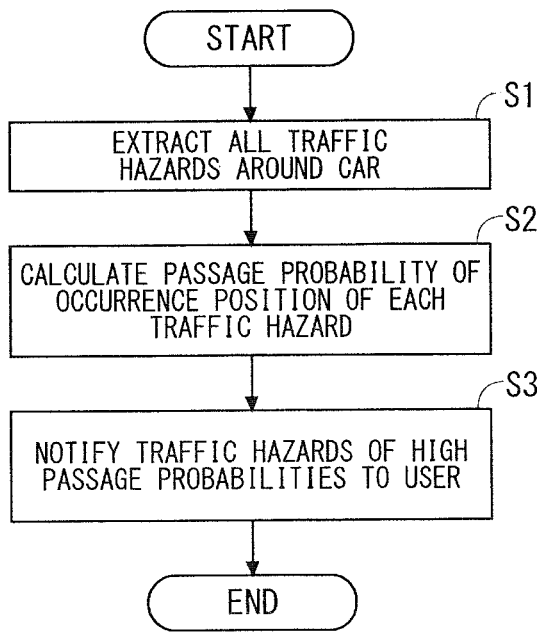
FIG. 2 shows a flowchart showing an operation of the traffic information notification device according to the present invention.

FIG. 2 shows a flowchart showing an operation of the traffic information notification device according to the present invention. The traffic information notification device according to the present invention executes processing shown in FIG. 2 when the own car starts traveling and, in addition, every time the car passes a crossroad.

The operation of the traffic information notification device according to the present invention will be described with reference to FIG. 2. First, in step S1, the traffic information notification device extracts occurrence information of all traffic hazards which occur around the own car (e.g. in a range in which a distance from the own car is a predetermined value or less), from the traffic information received by the traffic information receiver 11.

Next, in step S2, the traffic information notification device calculates a probability (passage probability) that the own car passes the occurrence position of the traffic hazard extracted in step S1. More specifically, the passage probability calculator 15 performs the following processing.

That is, in step S2, the passage probability calculator 15 finds one or more routes in which the own car is predicted to pass, based on the current position of the own car detected by the current position detector 14 and the traveling history data of the own car stored in the traveling history data storage 12. Further, the passage probability calculator 15 calculates the passage probability of each predicted route by using the traveling history data of the own car. In this case, when the predicted route includes the occurrence position of the traffic hazard extracted in step S1, the passage probability of this route is a passage probability of the traffic hazard.

Further, in step S3, the traffic information notification device notifies occurrence information of traffic hazards of high probabilities to a user by using the display unit 16 or the sound output unit 17. This notification method includes, for example, displaying symbols indicating occurrence positions of traffic hazards on a map around the own car on the display unit 16, highlighting and displaying roads including occurrence positions of traffic hazards, highlighting and displaying routes to occurrence positions of traffic hazards, and outputting sounds for notifying occurrence positions of traffic hazards from the sound output unit 17.

Particularly, in step S3, features of the present invention lie in notifying occurrence information of traffic hazards to the user by modes corresponding to probabilities of traffic hazards. The method of notifying occurrence information of traffic hazards according to the present invention will be specifically described below.

Figures 3, 4:
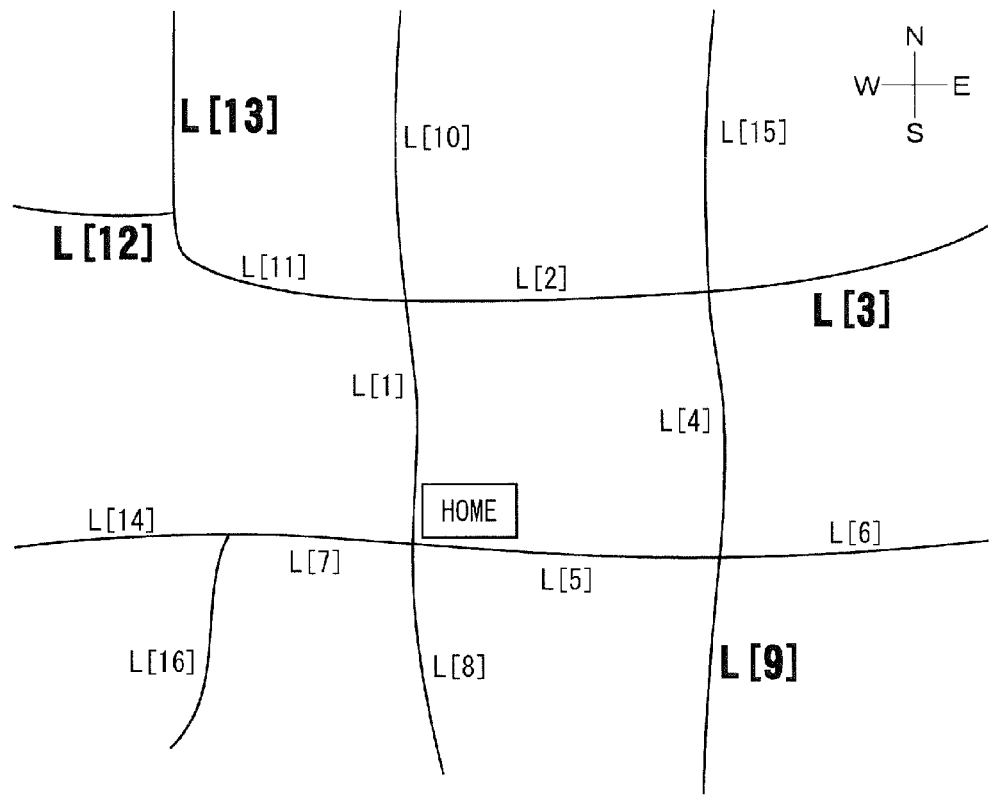
FIG. 3 shows a view showing an example of a road network.
FIG. 4 shows a view showing an example of traveling history data stored in a traveling history data storage.

In each of the following embodiments, cases where an own car travels in a road network shown in FIG. 3 will be described as examples. Roads which make up the road network in FIG. 3 are assigned identifiers L[1] to L[16]. Further, it is assumed that traffic congestion which is a traffic hazard occurs in the roads L[3], L[9], L[12] and L[13] indicated by bold lines in FIG. 3.

Furthermore, it is assumed that there is a home of a user of the traffic information notification device near a crossroad at which the roads L[1], L[5], L[7] and L[8] are connected, and traveling history data shown in FIG. 4 is stored in the traveling history data storage 12 of the traffic information navigation device. That is, in the traveling history data storage 12, seven types of items of traveling history data such as a route A which passes the roads L[1]→L[11]→L[13] in order (the number of times of traveling is 63 times), a route B which passes the roads L[1]→L[11]→L[12] in order (the number of times of traveling is 28 times), a route C which passes the roads L[1]→L[2]→L[3] in order (the number of times of traveling is 15 times), a route D which passes the road L[8] (the number of times of traveling is 23 times), a route E which passes L[5]→L[9] in order (the number of times of traveling is 31 times), a route F which passes the roads L[1]→L[10] in order (the number of times of traveling is 25 times) and a route G which passes the roads L[1]→L[2]→L[15] in order (the number of times of traveling is 13 times) from the user's home as a starting point are stored.

In the first embodiment, when there is a plurality of occurrence positions of traffic hazards, the traffic information notification device notifies occurrence information of the traffic hazards in order of higher passage probabilities to a user (driver). Further, all traffic hazards which are occurring are not notified.

Only a predetermined number of traffic hazards of high passage probabilities are notified. In this regard, an example where three traffic hazards of high passage probabilities are notified will be described.

When, for example, the own car leaves home and starts traveling north on the road L[1], the traffic information notification device extracts information about traffic congestions on the roads L[3], L[9], L[12] and L[13] as traffic hazards which occur around the own car, from traffic information received by the traffic information receiver 11 (step S1).

Next, the traffic information notification device calculates probabilities (passage probabilities) that the own car encounters the traffic congestions on the roads L[3], L[9], L[12] and L[13] (step S2). In view of the number of times of traveling in each route in the traveling history data in FIG. 4, the passage probabilities of the routes are higher in order of the route A, the route E, the route B, the route F, the route D, the route C and the route G. In view of the above, it is determined that the traffic hazard of the highest passage probability is traffic congestion on the road L[13] included in the route A, the traffic hazard of the second highest passage probability is traffic congestion on the road L[12] included in the route B, and the traffic hazard of the third highest passage probability is traffic congestion on the road L[3] included in the route C. In addition, the route E including the route L[9] does not include the road L[1] on which the car is traveling, and the passage probability of traffic congestion on the road L[9] is calculated as 0.

Further, the traffic information notification device selects three traffic hazards of high passage probabilities, i.e., traffic congestions on the roads L[13], L[12] and L[3] as notification targets, and notifies these traffic hazards to the user in order of higher passage probabilities (step S3).

Figure 5:
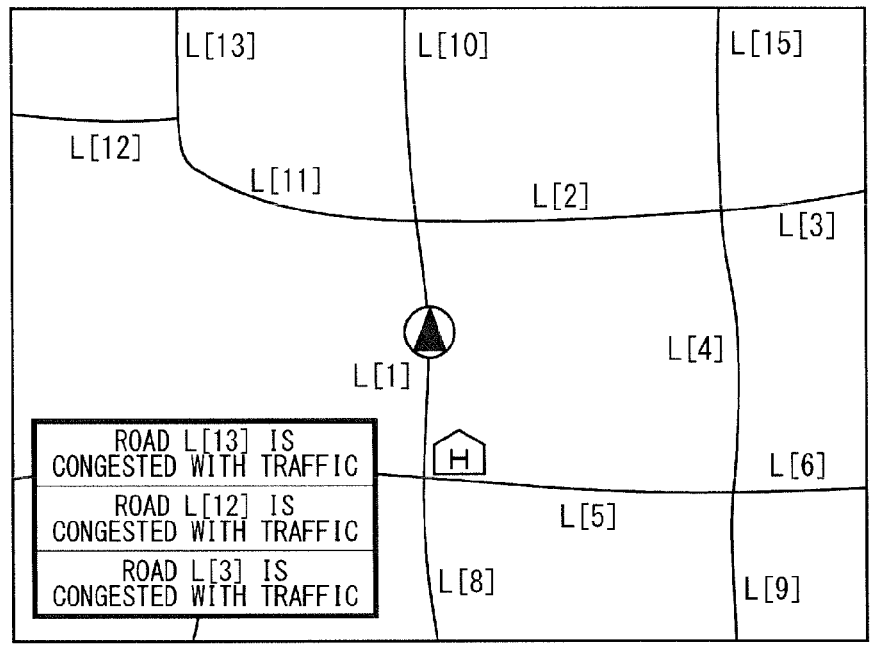
FIG. 5 shows a view showing an example of a mode to display occurrence information of traffic hazards in the traffic information notification device according to a first embodiment.

FIG. 5 shows a view showing an example of a mode to display occurrence information of traffic hazards in the traffic information notification device according to the first embodiment, and shows a display example of a screen of the display unit 16. Hereinafter, the identifiers L[1] to L[16] of the roads are indicated on the screen of the display unit 16 described below with reference to the drawings for ease of description. However, these identifiers may not be displayed on the actual screen.

The traffic information notification device according to the first embodiment arranges three pieces of traffic information of high passage probabilities, from the top in order of higher passage probabilities, and displays the traffic information on the screen of the display unit 16. In an example in FIG. 5, traffic information is arranged in order of traffic congestion information of the road L[13], traffic congestion information of the road L[12] and traffic congestion information of the road L[3], and is displayed.

Subsequently, every time the own car passes a crossroad, the processing in FIG. 2 is repeated. For example, it is assumed that the car turns right at the crossroad from the road L[1], and enters the road L[2]. Routes including the road L[2] are only the route C and the route G in the traveling history data in FIG. 4. Therefore, it is determined that the passage probability of traffic congestion on the road L[3] included in the route C is the highest. In addition, the route A including the road L[13], the route B including the road L[12], and the route E including the road L[9] do not include the road L[2]. Therefore, it is determined that the passage probabilities of traffic congestions on the roads L[13], L[12] and L[9] are 0. Hence, only the traffic congestion information of the road L[3] is displayed on the screen of the display unit 16 as shown in FIG. 6.

Thus, the traffic information notification device according to the first embodiment notifies occurrence information of traffic hazards of high passage probabilities to the user and skips notifying occurrence information of traffic hazards of low passage probabilities, and, consequently, provides adequate information to the user. Further, a mode to notify occurrence information of each traffic hazard changes according to a passage probability of each traffic hazard (higher passage probabilities are displayed at the top in the first embodiment). Consequently, the users can intuitively recognize the value of the passage probability of each traffic hazard based on the notification mode. Consequently, by, for example, mounting the traffic information notification device on the car navigation device, the user can obtain adequate occurrence information of traffic hazards even when a destination is not set.

Further, a predetermined number of (three) notification target traffic hazards are selected from traffic hazards of high passage probabilities, and traffic hazards are not limited only to a traffic hazard of one estimated route. Consequently, the user can obtain highly flexible information. At, for example, a stage at which the own car travels on the road L[1] as shown in FIG. 5, not only occurrence information of a traffic hazard in the route A in which the car is the most likely to pass but also occurrence information of traffic hazards in the route B and the route C are notified. Consequently, even when the own car travels out of the route A and moves on the route C as shown in FIG. 6, the occurrence information of the traffic hazard on the road L[3] is notified to the user. Consequently, it is possible to prevent the car from unexpectedly encountering a traffic hazard.

Figure 6:
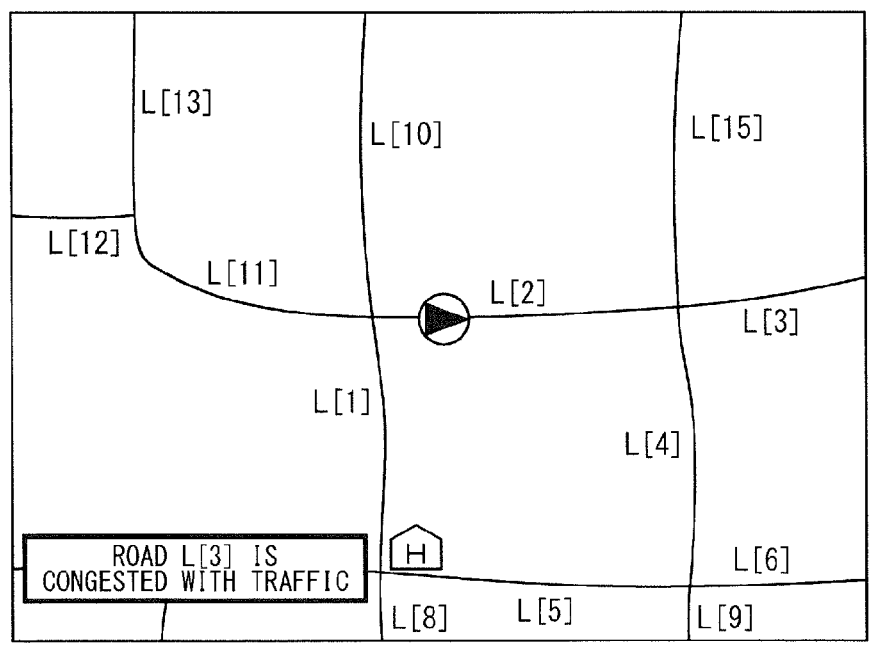
FIG. 6 shows a view showing an example of a mode to display occurrence information of traffic hazards in the traffic information notification device according to the first embodiment.

An example has been described with the display example of the display unit 16 shown in FIGS. 5 and 6 where occurrence information of traffic hazards is arranged in order of higher passage probabilities and displayed. However, a method of displaying occurrence information may be arbitrary as long as a mode which allows whether a passage probability of each traffic hazard is high or low to be recognized is adopted. The method is, for example, a method of displaying occurrence information of a traffic hazard of a higher passage probability, with characters of darker colors (more distinct colors), or a method of displaying occurrence information of a traffic hazard of a higher passage probability, with bolder characters.

Further, means that notifies a traffic hazard is not limited to the display unit 16, and the sound output unit 17 may be used. For example, instead of the indication in FIG. 5, the sound output unit 17 may audibly output that "traffic congestion spots are the road L[13], the road L[12] and the road L[3]" in order of higher passage probabilities. Alternatively, traffic hazards may be notified by changing a frequency to audibly notify a traffic hazard according to a passage probability of the traffic hazard, and more frequently audibly notifying, for example, a traffic hazard of a higher passage probability. Naturally, notification performed by using the display unit 16 and notification performed by using the sound output unit 17 may be used in combination.

In addition, in the first embodiment, the traffic information notification device is configured to select only a predetermined number of (three) traffic hazards of higher passage probabilities, from all traffic hazards, and notify the traffic hazards. In this case, there is a concern that, when, for example, the number of traffic hazards which are occurring is small, even traffic hazards of low passage probabilities are selected, and less useful information is notified to the user. This problem can be solved by providing a threshold for notification, to passage probabilities of traffic hazards. For example, traffic hazards whose passage probabilities are less than 5% (or less than 10%) may not be notified.

Second Embodiment

A configuration is employed in the second embodiment where traffic hazards are limited to traffic hazards which occur in routes of high passage probabilities and a traffic hazard of a higher passage probability is selected from the traffic hazards instead of selecting a traffic hazard of a higher passage probability from all traffic hazards when selecting a notification target traffic hazard.

A case is also considered herein where an own car leaves home and starts traveling north on a road L[1] in the road network in FIG. 3. In the first embodiment, three traffic hazards of high passage probabilities, i.e., traffic congestions on roads L[13], L[12] and L[3] are selected from all traffic hazards, and these traffic hazards are arranged in order of higher passage probabilities and displayed (FIG. 5).

By contrast with this, the traffic information notification device according to the second embodiment first selects a predetermined number of routes of higher passage probabilities from traveling history data (FIG. 4). In this regard, the three routes are selected. In this case, routes A, B and F which include the route L[1] and whose number of times of traveling is large are selected.

Figure 7:
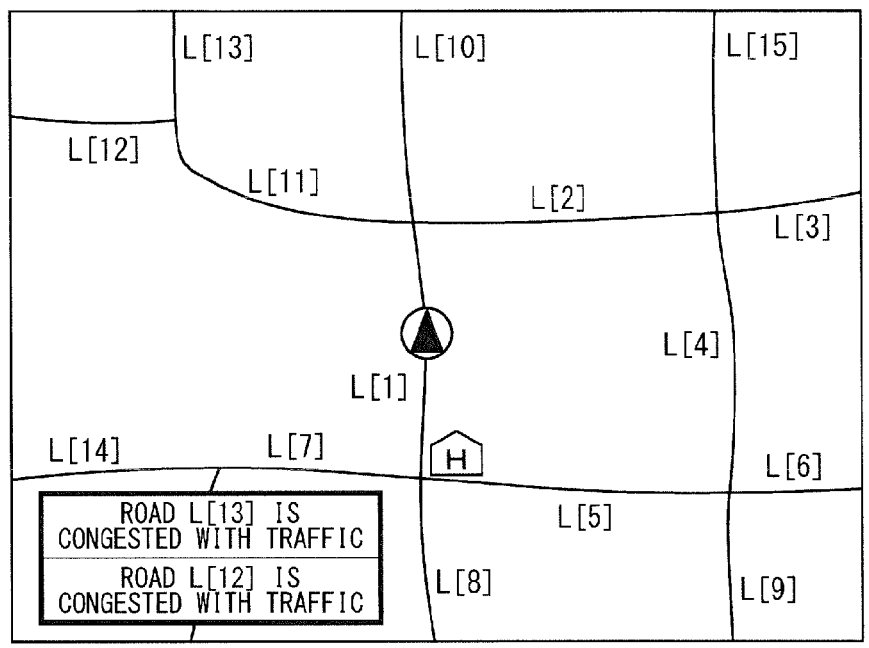
FIG. 7 shows a view showing an example of a mode to display occurrence information of traffic hazards in the traffic information notification device according to a second embodiment.

Subsequently, the traffic information notification device selects traffic hazards of higher passage probabilities which occur in routes included in the routes A, B and F, i.e., traffic congestion on the road L[13] and traffic congestion on the road L[12], arranges the traffic hazards in order of higher passage probabilities and displays the traffic hazards. That is, in the second embodiment, when an own car travels on the road L[1], traffic congestion information of the road L[3] is not displayed unlike the first embodiment, and only traffic congestion information of the roads L[13] and L[12] is displayed as shown in FIG. 7.

By limiting notification target traffic hazards to traffic hazards in routes of higher passage probabilities in advance as in the second embodiment, it is possible to solve the problem in the first embodiment that there is a concern that even traffic hazards of very low passage probabilities are notified, without providing a threshold to passage probabilities of traffic hazards.

Also in the second embodiment, means that notifies traffic hazards is not limited to a display unit 16, and a sound output unit 17 may be used. Notification performed by the display unit 16 and notification performed by the sound output unit 17 may be used in combination.

Third Embodiment

The method of notifying occurrences of traffic hazards by way of characters or sounds has been adopted in the first embodiment. However, in the third embodiment, occurrence information of traffic hazards is notified to a user by displaying, for example, symbols representing occurrence positions or occurrence zones of traffic hazards on a map displayed on a display unit 16. In addition, a method of selecting notification target traffic hazards may adopt any one of the methods in the first and second embodiments. However, a case where the method in the first embodiment is adopted will be described below.

A case is also considered herein where an own car leaves home and starts traveling north on a road L[1] in the road network in FIG. 3. Similar to the first embodiment, three traffic hazards of high passage probabilities, i.e., traffic congestions on roads L[13], L[12] and L[3] are selected as notification targets from all traffic hazards. In the third embodiment, as shown in FIG. 8, lines representing the roads L[13], L[12] and L[3] in which selected traffic hazards occur are displayed on a map by a mode (colors, thickness and change patterns (dynamic display patterns such as flashes)) which allows the lines to be distinguished from other roads.

Also in the third embodiment, it is possible to provide the same effect as that in the first embodiment. That is, occurrence information of traffic hazards of high passage probabilities is notified to the user, and notifying occurrence information of traffic hazards of low passage probabilities is skipped. Consequently, it is possible to provide adequate information to the user. Further, a mode to notify occurrence information of each traffic hazard changes according to a passage probability of each traffic hazard (only roads in which traffic hazards of high passage probabilities occur are displayed by a mode different from those of other roads).

Consequently, the users can intuitively recognize the value of the passage probability of each traffic hazard based on the mode to notify each traffic hazard. Furthermore, it is also possible to provide an effect that occurrence positions of traffic hazards can be easily recognized from map images.

Figure 8:
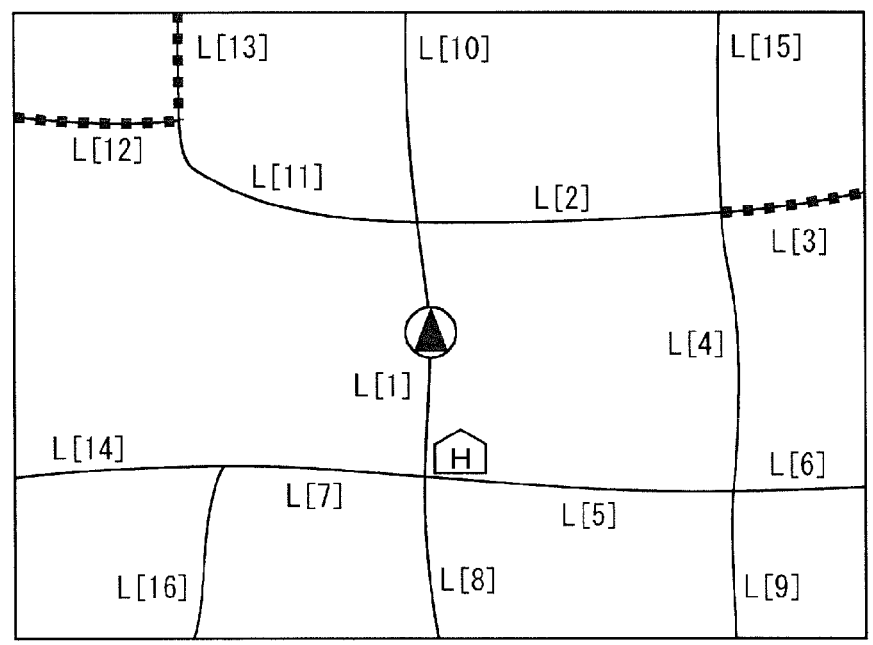
FIG. 8 shows a view showing an example of a mode to display occurrence information of traffic hazards in the traffic information notification device according to a third embodiment.
Figure 9:
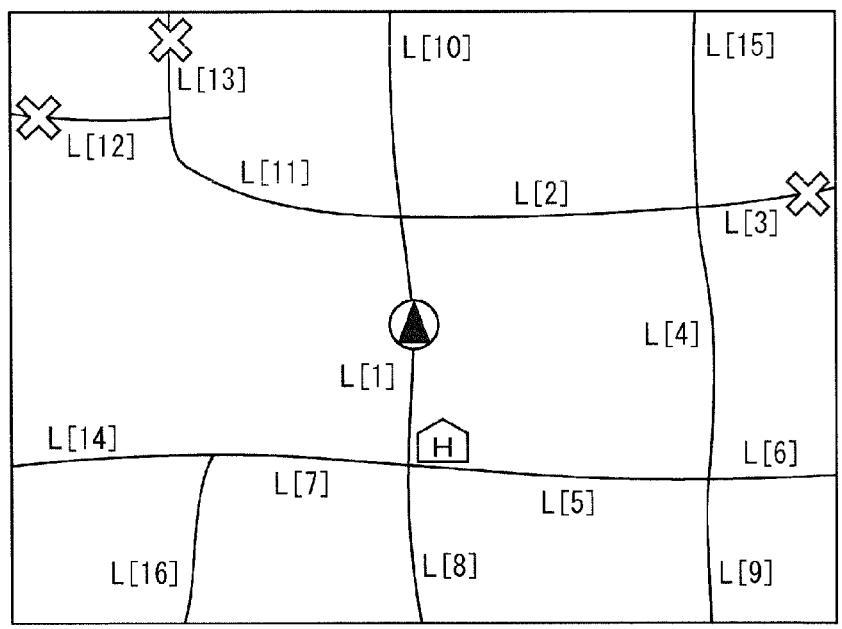
FIG. 9 shows a view showing an example of a mode to display occurrence information of traffic hazards in the traffic information notification device according to the third embodiment.
Figure 10:
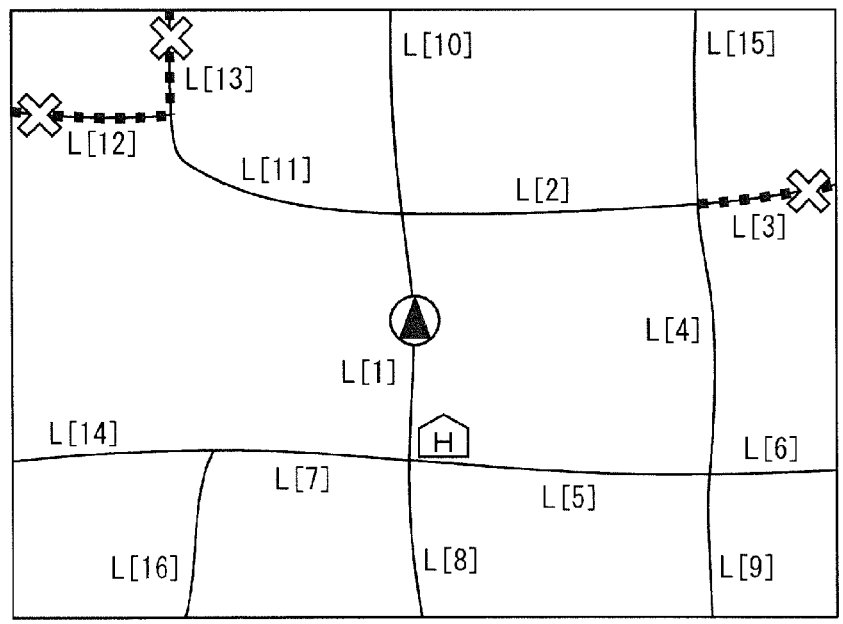
FIG. 10 shows a view showing an example of a mode to display occurrence information of traffic hazards in the traffic information notification device according to the third embodiment.

FIG. 8 shows that lines representing roads in which traffic hazards of high passage probabilities occur are displayed on a map by a mode which allows the lines to be distinguished from other roads. However, occurrence positions of traffic hazards may be displayed as predetermined symbols ("×" symbols in this case) on the map as shown in FIG. 9. Further, as shown in FIG. 10, the lines (FIG. 8) representing the roads in which traffic hazards of high passage probabilities occur, and the symbols (FIG. 9) representing occurrence positions of these traffic hazards may both be displayed on the map.

Figure 11:
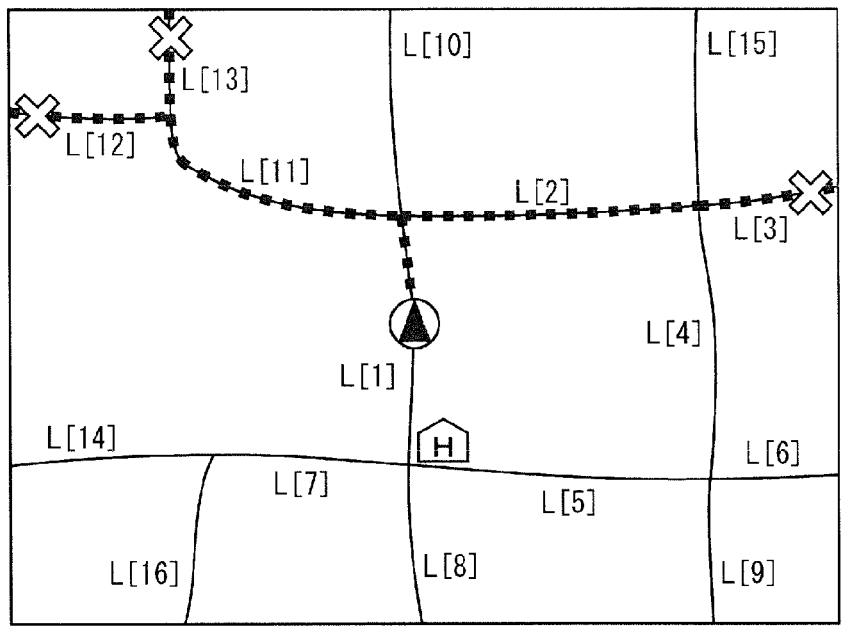
FIG. 11 shows a view showing an example of a mode to display occurrence information of traffic hazards in the traffic information notification device according to the third embodiment.

Furthermore, as shown in FIG. 11, not only roads in which traffic hazards of high passage probabilities occur, but also routes from an own car position to those roads may be displayed on the map by a mode which allows the roads and routes to be distinguished from the other roads. Even when, for example, occurrence positions of traffic hazards go out of the screen of the display unit 16 and cannot be viewed as a result of enlargement of a scale of the map, it is possible to provide an effect that it is possible to recognize whether or not a probability that the own car encounters a traffic hazard is high.

In addition, notifying traffic hazards by displaying the traffic hazards on the map according to the third embodiment and notifying traffic hazards with characters or sounds described in the first embodiment may be used in combination.

Fourth Embodiment

In the third embodiment, modes to display occurrence information of traffic hazards corresponding to passage probabilities have only two patterns to display or not to display the occurrence information to distinguish from other roads are used.

In the fourth embodiment, three patterns or more of display modes (e.g. colors, boldness and change patterns) are used.

A case is also considered herein where an own car leaves home and starts traveling north on a road L[1] in the road network in FIG. 3. Similar to the first embodiment, three traffic hazards of high passage probabilities, i.e., traffic congestions on roads L[13]. L[12] and L[3] are selected as notification targets from all traffic hazards. In the fourth embodiment, as shown in FIG. 12, lines representing selected roads L[13], L[12] and L[3] in which selected traffic hazards occur are displayed on a map by a mode which allows the lines to be distinguished from the other roads and to recognize whether passage probabilities are high or low.

Figure 12:
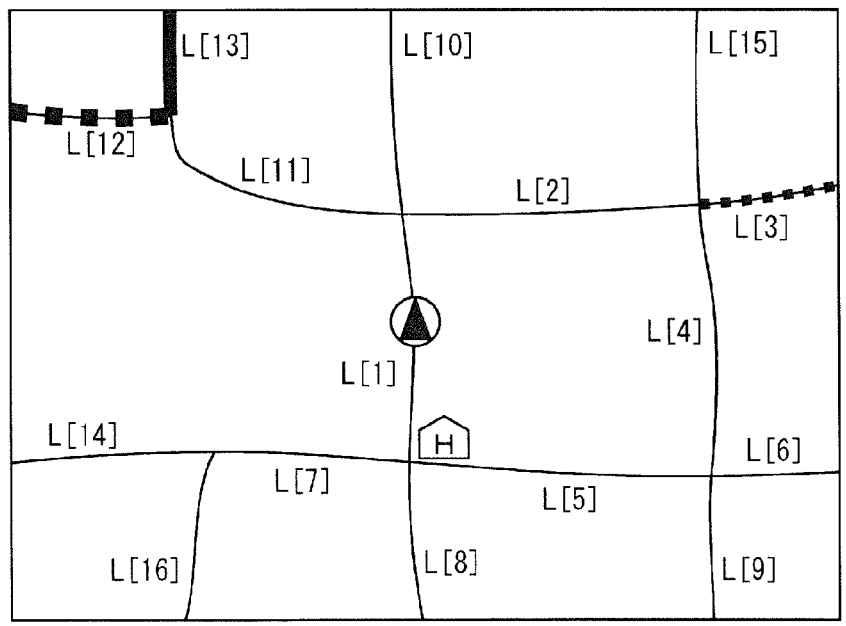
FIG. 12 shows a view showing an example of a mode to display occurrence information of traffic hazards in the traffic information notification device according to a fourth embodiment.

In an example in FIG. 12, the road L[13] in which traffic congestion of the highest passage probability occurs is indicated by a bold solid line. The road L[12] in which traffic congestion of the second highest passage probability occurs is indicated by a bold broken line. The road L[3] in which traffic congestion of the third highest passage probability occurs is indicated by a thin broken line. These display modes are arbitrary as long as the display modes can be distinguished from each other. However, a more distinct display mode is desirably used for a higher passage probability.

According to the fourth embodiment, the same effect as that of the third embodiment can be obtained.

In addition, it is also possible to provide an effect that not only occurrence positions of traffic hazards but also passage probabilities of the traffic hazards (probabilities that a car encounters traffic hazards) can be intuitively recognized from map images.

Figure 13:
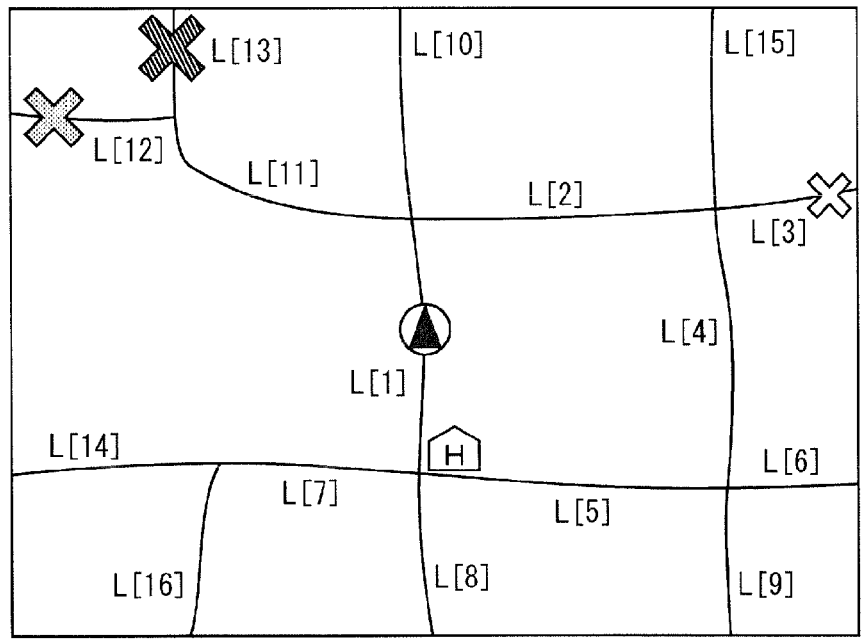
FIG. 13 shows a view showing an example of a mode to display occurrence information of traffic hazards in the traffic information notification device according to the fourth embodiment.

FIG. 12 shows that lines representing roads in which traffic hazards of high passage probabilities occur are displayed on a map by a mode which allows the lines to be distinguished from other roads. However, occurrence positions of traffic hazards may be displayed as predetermined symbols ("×" symbols) on the map as shown in FIG. 13. In this case, these symbols are displayed on a map by a mode which allows whether the passage probabilities are high or low to be recognized. In the example in FIG. 13, larger symbols are displayed and highlighted at occurrence spots of traffic congestion of high passage probabilities. Further, a pattern (color) of each symbol also takes a more distinct pattern for a higher passage probability.

Figure 14:
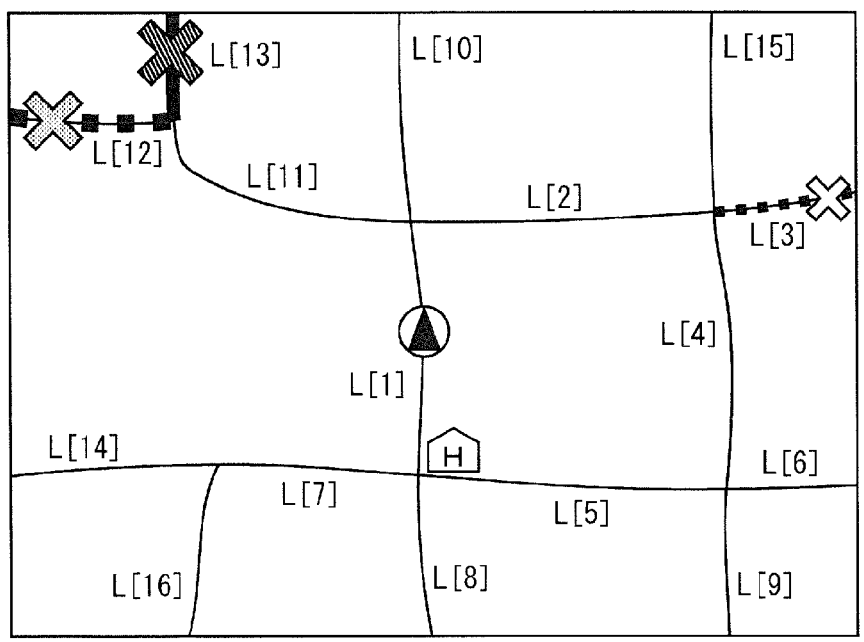
FIG. 14 shows a view showing an example of a mode to display occurrence information of traffic hazards in the traffic information notification device according to the fourth embodiment.

Furthermore, as shown in FIG. 14, the lines (FIG. 12) representing the roads in which traffic hazards of high passage probabilities occur, and the symbols (FIG. 13) representing occurrence positions of these traffic hazards may both be displayed on the map.

Figure 15:
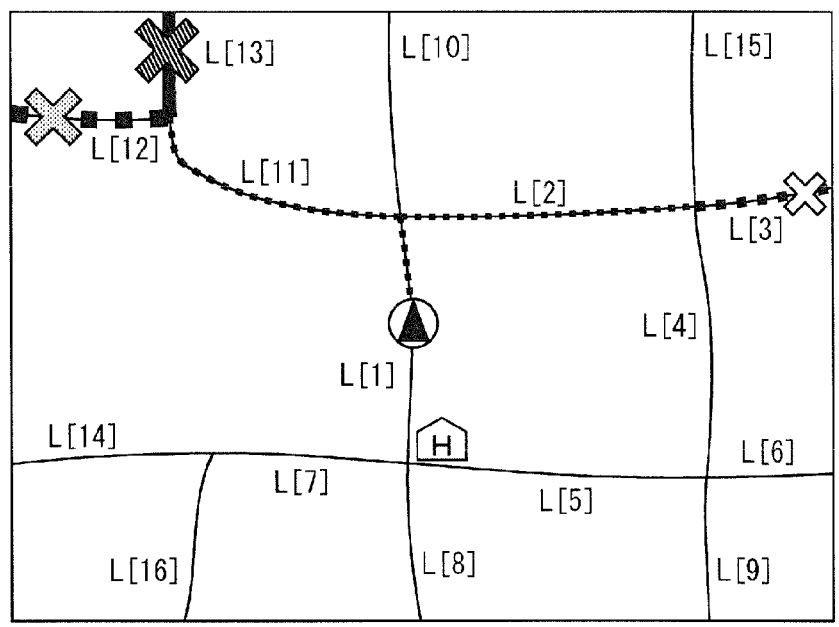
FIG. 15 shows a view showing an example of a mode to display occurrence information of traffic hazards in the traffic information notification device according to the fourth embodiment.
Figure 16:
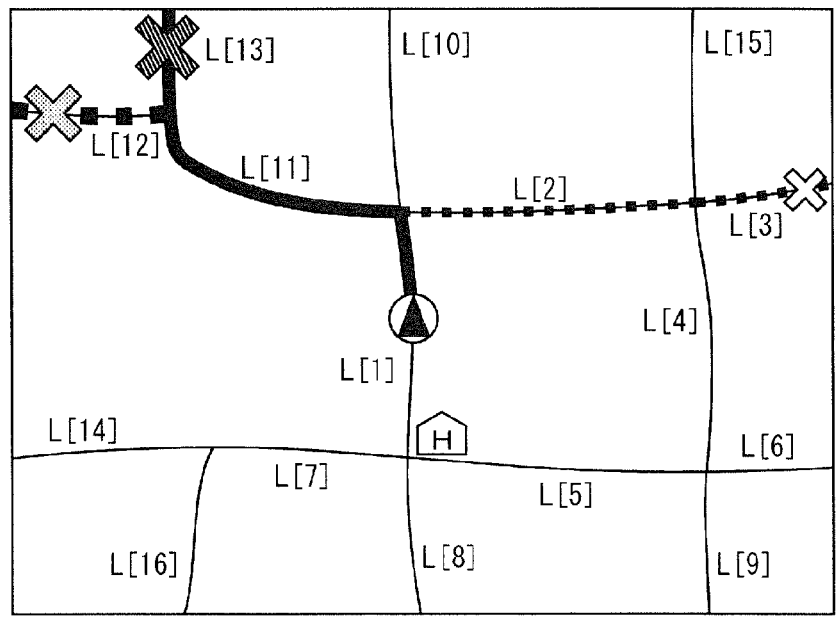
FIG. 16 shows a view showing an example of a mode to display occurrence information of traffic hazards in the traffic information notification device according to the fourth embodiment.

Still further, as shown in FIG. 15, not only roads in which traffic hazards of high passage probabilities occur, but also routes from an own car position to those roads may be displayed on the map by a mode which allows the roads and routes to be distinguished from other roads. In this regard, as shown in FIG. 16, the routes from an own car position to roads in which traffic hazards occur may also be displayed by a mode which allows whether or not the passage probabilities of the traffic hazards are high or low to be recognized. Even when, for example, occurrence positions of traffic hazards go out of the screen of the display unit 16 and cannot be viewed as a result of enlargement of a scale of the map, it is possible to provide an effect that it is possible to recognize a probability that the own car encounters a traffic hazard.

In addition, notifying traffic hazards by displaying the traffic hazards on the map according to the fourth embodiment and notifying traffic hazards with characters or sounds described in the first embodiment may be used in combination.

Fifth Embodiment

When, for example, the method according to the second embodiment is adopted as a method of selecting notification target traffic hazards in the third or fourth embodiment, a fact that traffic hazards do not occur in all routes of high passage probabilities frequently occurs. In the fifth embodiment, in such a case, routes of high passage probabilities are displayed by a display mode different from those of the other cases.

A case is considered herein where no traffic hazard occurs, and an own car leaves home and starts traveling north on a road L[1] in the road network in FIG. 3. The traffic information notification device according to the fifth embodiment first selects a predetermined number of routes of high passage probabilities from traveling history data (FIG. 4) similar to the second embodiment. When, for example, three routes are selected, routes A, B and F which include the route L[1] and whose numbers of times of traveling are large are selected. When a traffic hazard occurs in one of these routes A, B and F, an operation in the third or fourth embodiment is performed.

Here, the traffic hazard does not occur in the road network in FIG. 3. In this case, the traffic information notification device displays the routes A, B and F by a mode different from those of the other roads to indicate that traffic hazards do not occur in the routes A, B and F as shown in FIG. 17. In FIG. 17, the routes A, B and F are displayed as dashed-dotted lines to indicate that traffic hazards do not occur in those routes.

According to the present embodiment, when traffic hazards do not occur in routes of high passage probabilities, it is possible to provide an effect that the user can recognize at a glance that the traffic hazards do not occur.

Further, instead of displaying the routes as shown in FIG. 17, character representations or audible output, such as "traffic hazards do not occur in routes of high passage probabilities", may be displayed and notified by using a display unit 16 and a sound output unit 17. Naturally, together with the indication in FIG. 17, character representations or audible output may be performed.

In addition, the embodiments of the present invention can be freely combined within the scope of the invention or can be optionally modified or omitted.

The present invention has been described in detail. However, the above description is exemplary in all aspects, and the present invention is not limited to the above description. It should be understood that an infinite number of modified examples which are not described can be assumed without deviating from the scope of the invention.

REFERENCE SIGNS LIST

11 TRAFFIC INFORMATION RECEIVER, 12 TRAVELING HISTORY DATA STORAGE, 13 MAP DATA STORAGE, 14 CURRENT POSITION DETECTOR, 15 PASSAGE PROBABILITY CALCULATOR, 16 DISPLAY UNIT, 17 SOUND OUTPUT UNIT, 18 CONTROLLER.

The invention claimed is:

1. An in-vehicle traffic information notification device comprising:
   a current position detector that detects a current position of an own car;
   a traveling history data storage that stores traveling history data of said own car;
   a traffic information receiver that obtains traffic information including an occurrence position of a traffic hazard;
   a passage probability calculator that calculates a passage probability that is a probability that said own car passes an occurrence position of each traffic hazard, from the current position and the traveling history data of said own car; and
   a traffic hazard notifier that notifies occurrence information of each traffic hazard to a user by a different output mode according to the passage probability of the traffic hazard, wherein the different output modes are either visually or audibly different from each other.

2. The in-vehicle traffic information notification device according to claim 1, wherein, when there is a plurality of occurrence positions of traffic hazards, said traffic hazard notifier notifies occurrence information of the traffic hazards in order of higher passage probabilities.

3. The in-vehicle traffic information notification device according to claim 2, wherein said traffic hazard notifier includes a display unit that arranges the occurrence information of the traffic hazards in order of the higher passage probabilities and displays the occurrence information.

4. The in-vehicle traffic information notification device according to claim 2, wherein said traffic hazard notifier includes a sound output unit that audibly outputs the occurrence information of the traffic hazards in order of the higher passage probabilities.

5. The in-vehicle traffic information notification device according to claim 1, wherein said traffic hazard notifier includes a display unit that displays the occurrence information of the traffic hazard by a different display mode according to the passage probability of the traffic hazard.

6. The in-vehicle traffic information notification device according to claim 1, wherein said traffic hazard notifier includes a sound output unit that audibly outputs the occurrence information of the traffic hazard at a different frequency according to the passage probability of the traffic hazard.

7. The in-vehicle traffic information notification device according to claim 1, wherein said traffic hazard notifier includes a map information display unit that displays the occurrence position of the traffic hazard on a map by a different display mode according to the passage probability of the traffic hazard.

8. The in-vehicle traffic information notification device according to claim 7, wherein said map information display unit displays a symbol that represents the occurrence position of the traffic hazard, with a different color, size or change pattern according to the passage probability of the traffic hazard.

9. The in-vehicle traffic information notification device according to claim 8, wherein said map information display unit displays a road to which the occurrence position of the traffic congestion belongs, with a different color, thickness or change pattern according to the passage probability of the traffic hazard.

10. The in-vehicle traffic information notification device according to claim 7, wherein said map information display unit displays a route from the current position of said own car to the occurrence position of the traffic hazard, by a different display mode according to the passage probability of the traffic hazard.

11. The in-vehicle traffic information notification device according to claim 10, wherein said map information display unit displays the route from the current position of said own car to the occurrence position of the traffic hazard, with a different color, thickness or change pattern according to the passage probability of the traffic hazard.

12. The in-vehicle traffic information notification device according to claim 7, wherein
   a predetermined number of routes that said own car is highly likely to pass is specified based on the current position and the traveling history data of said own car, and
   when a traffic hazard does not occur in said predetermined number of specified roads, said map information display unit displays the predetermined number of routes by a display mode different from that of another road.

13. The in-vehicle traffic information notification device according to claim 1, wherein
   a predetermined number of routes that said own car is highly likely to pass is specified based on the current position and the traveling history data of said own car, and
   when a traffic hazard does not occur in said predetermined number of specified roads, said traffic hazard notifier notifies to the user that the traffic hazard does not occur.

14. The in-vehicle traffic information notification device according to claim 1, wherein said passage probability calculator calculates said passage probability every time said own car passes a crossroad.

* * * * *